United States Patent [19]
Krenz

[11] Patent Number: 4,527,766
[45] Date of Patent: Jul. 9, 1985

[54] VIDEO DISPLAY TILT APPARATUS
[75] Inventor: Horst M. Krenz, St. Joseph, Mich.
[73] Assignee: Heath Company, St. Joseph, Mich.
[21] Appl. No.: 500,125
[22] Filed: Jun. 1, 1983
[51] Int. Cl.³ .............................................. A47G 29/00
[52] U.S. Cl. .................................... 248/371; 248/185; 248/188.2; 248/396
[58] Field of Search ............... 248/185, 371, 394, 396, 248/652, 653, 664, 421, 346, 188.2

[56] References Cited
U.S. PATENT DOCUMENTS

| | | | |
|---|---|---|---|
| 2,041,615 | 5/1936 | Maslowski | 248/421 |
| 2,513,440 | 7/1950 | Alderson | 248/188.2 |
| 3,373,879 | 3/1968 | Verini | 248/656 X |
| 3,586,271 | 6/1971 | Sloyan | 248/652 |
| 3,789,140 | 1/1974 | McQueen et al. | 178/7.81 |
| 4,372,515 | 2/1886 | Noonan | 248/178 |

FOREIGN PATENT DOCUMENTS

| | | | |
|---|---|---|---|
| 2547235 | 5/1977 | Fed. Rep. of Germany | 248/349 |
| 1128261 | 1/1957 | France | 248/421 |
| 113202 | 1/1926 | Switzerland | 248/653 |
| 2423 | of 1886 | United Kingdom | 248/185 |

Primary Examiner—J. Franklin Foss

[57] ABSTRACT

Apparatus for selectively controlling the viewing angle of a video display unit by adjusting the tilt of the unit by means of a single, readily accessible manual control is disclosed. A viewer-operated control knob is used to rotate a shaft located within a linear recessed portion on an upper surface of a display support structure. The shaft includes right- and left-hand threaded portions to which lower end portions of respective support links are pivotally coupled allowing the linear displacement thereof. The upper end of each link is pivotally coupled to a support platform which is raised or lowered depending upon the direction of rotation of the control knob. A conventional video display unit is positioned upon the support structure which may take the form of an enclosed case for housing video display spare parts or additional circuitry. The support platform is positioned in contact with a lower, aft portion of the video display unit permitting its viewing angle to be easily adjusted by means of a single manual control. The tilt angle can be varied continuously between −5° and +10° with stable position locking available at any intermediate angle.

14 Claims, 8 Drawing Figures

U.S. Patent  Jul. 9, 1985  4,527,766
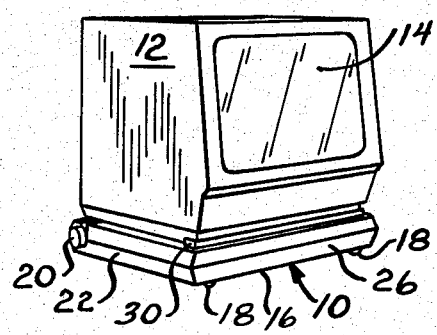
FIG. 1
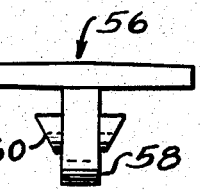
FIG. 3
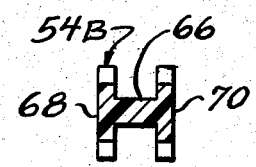
FIG. 4
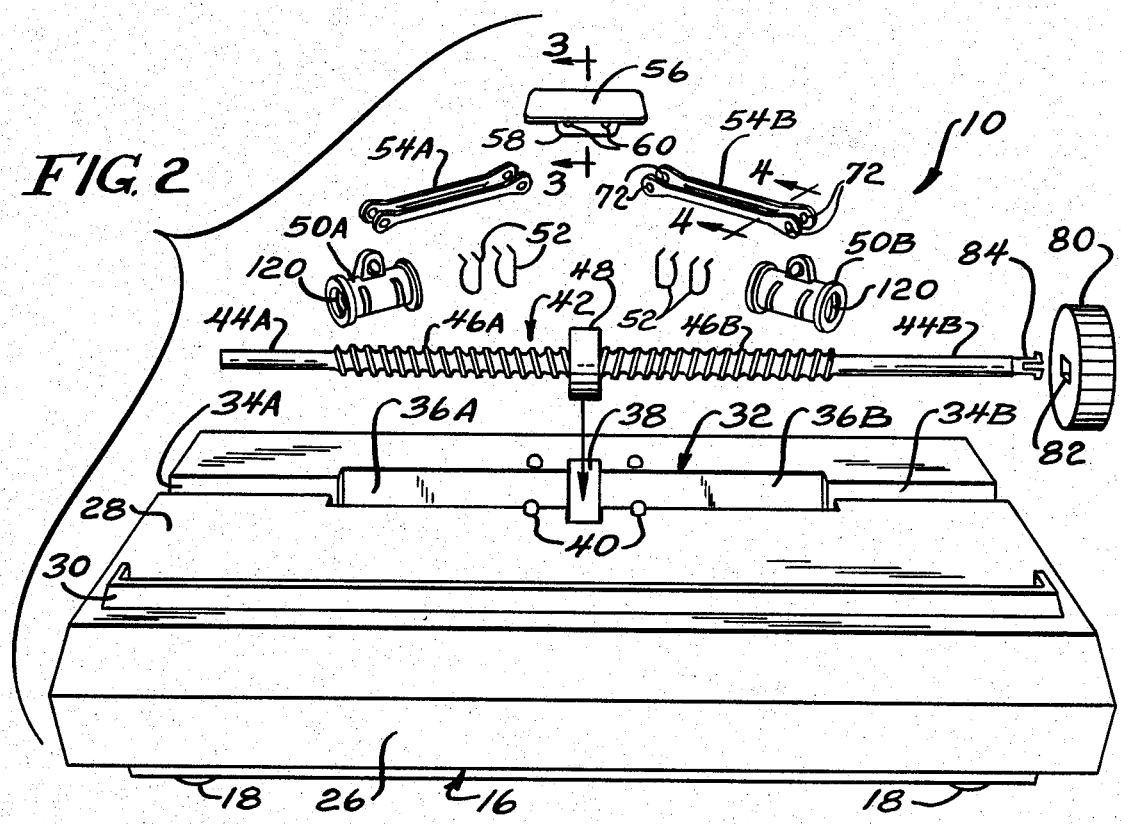
FIG. 2
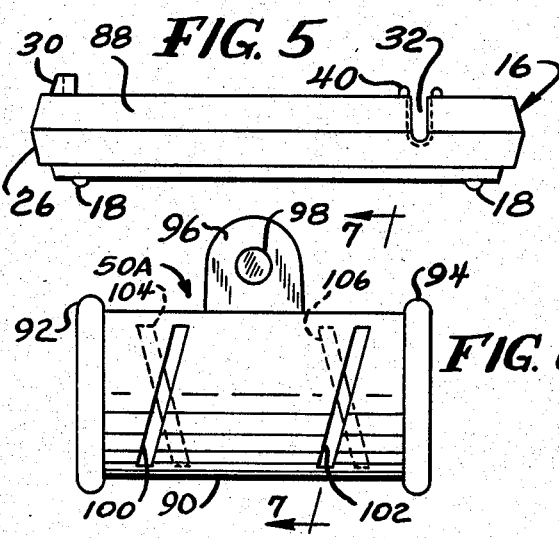
FIG. 5
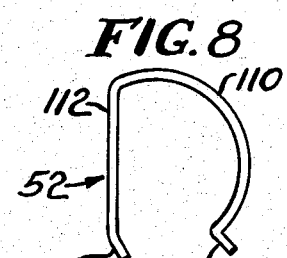
FIG. 8
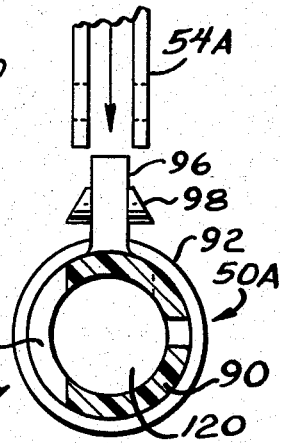
FIG. 6
FIG. 7

4,527,766

VIDEO DISPLAY TILT APPARATUS

BACKGROUND OF THE INVENTION

This invention relates in general to video display support structures and is particularly directed to manually adjustable means for supporting a video display over a wide range of orientations to accommodate various viewing angles.

With the increased use of video displays such as cathode ray tubes (CRT's) in such applications as computer terminals, word processors, communications systems, and video monitoring equipment, increasing emphasis is being placed upon the interface between the user, or viewer, and the video display. Such parameters as video display sweep rates, background color and contrast, and the general viewability of the information on the video display faceplate all affect the quality of video information provided to the viewer and the ability of a system operator to use the thus displayed information.

Increasing at a rate similar to the expanding use of video displays are the fields of environmental and human factors engineering. Within the last several decades designers have approached their tasks with a consideration of the integration of a machine with man's total abilities. Prior to this, the design and structure of machines were made without consideration of man, his limitations, and his safety. The goal is, of course, to maximize productivity while insuring the worker's comfort, safety and well-being. In Europe, the new and rapidly developing field of human factors engineering is generally called ergonomics which is defining strict man-machine interface requirements in ever expanding work environments. The progressive activities in Europe in this field are gaining general acceptance there and will gradually be adopted throughout the industrialized world.

These efforts have addressed the video display environment with particular emphasis on improving the presentation of video information with minimum user inconvenience and hardship. A prime consideration has been directed toward the reduction of glare on the faceplate of the video display. This has been approached primarily with respect to he design and use of various video display tilt mechanisms for minimizing glare.

One approach has been to utilize a friction pivot in the base of the video display whereby the display may be tilted as desired and maintained in position by the friction pivot. One example of this approach can be found in U.S. Pat. No. 3,789,140 to McQueen et al wherein is disclosed an arrangement for manually tilting the primary image screen of a CRT about a horizontal first axis disposed slightly behind the screen by means of a hand wheel exposed through a cabinet enclosing the CRT. Manual torque is applied about a second axis parallel to and behind the first axis. A pinion rockable about the second axis by means of the hand wheel is enmeshed with a concave gear rack concentric with the first axis and has a radius of curvature larger than the pinion for torque transfer. Another approach to a friction pivot-type of CRT tilt arrangement is disclosed in U.S. Pat. No. 4,372,515 to Noonan which discloses a rocking tilt apparatus mounted to the base of a display unit which includes fore/aft retention by a spur gear on an upper support unit and a rack gear on a lower support unit which act to co-locate the origin of the arc of the rocker, the center of gravity and the origin of the arc of the pitch diameter of the spur gear of the display unit through the tilt range. Vertical retention is provided by means of a snubbing device including a spring-loaded friction mechanism which provides infinite actuation throughout the tilt range.

Other, less common, approaches have been used to selectively adjust the tilt angle of a video display. Another such arrangement utilizes a rotatable friction cam positioned beneath an aft portion of the video display for the selective vertical displacement thereof in providing the desired tilt angle. Yet another approach makes use of the combination of a convex lower portion of a display platform and a concave portion of a support stand. The convex portion is inserted in the concave portion in a complementary manner and retained there by means of a spring-loaded wing nut positioned within a longitudinal slot in a friction plate. By displacing the wing nut-spring combination along the longitudinal slot, the convex and concave surfaces are displaced relative to one another and the platform upon which the video display is positioned is tilted as desired. Other approaches involve various complicated arrangements of bellows, flexible members, and various coupled combinations of support links.

To date, an arrangement for the selective positioning of a video display unit which provides for a continuum of self-locking tilt positions over a wide angular range accomplished by means of a single, easily accessible and rapid adjustment which provides precise control of the display's tilt angle is not available. The present invention is intended to supplement the prior art by providing a system which possesses the aforementioned operating characteristics while being low in cost, comprised of easily manufactured parts, and easily assembled and maintained.

OBJECTS OF THE INVENTION

Accordingly, it is an object of the present invention to provide for improved viewing of a video display unit.

It is another object of the present invention to provide improved means for adjustably positioning a video display unit for optimum viewing.

Yet another object of the present invention is to provide a low cost, manually adjustable support stand for a video display unit capable of changing the display's viewing angle by means of a single rotary control.

A further object of the present invention is to provide a positioning mechanism having a single rotary-type control which is capable of continuous displacement over a wide range of positions and includes position "locking" over this entire displacement range.

BRIEF DESCRIPTION OF THE DRAWINGS

The appended claims set forth those novel features believed characteristic of the invention. However, the invention itself as well as further objects and advantages thereof, will best be understood by reference to the following detailed description of a preferred embodiment taken in conjunction with the accompanying drawings, where like reference numerals designate like elements throughout the various views, in which:

FIG. 1 is a perspective view of a video display unit positioned upon a tilt apparatus in accordance with the present invention;

FIG. 2 is an exploded perspective view of a video display tilt apparatus in accordance with a preferred embodiment of the present invention;

FIG. 3 is a cross sectional view of the platform portion of the tilt apparatus taken along the sight line 3—3 of FIG. 2;

FIG. 4 is a cross sectional view of a support link of the video display tilt apparatus shown in FIG. 2 taken along sight line 4—4;

FIG. 5 shows a side elevational view of the base portion of a video display tilt apparatus in accordance with the present invention;

FIG. 6 is a side elevational view of a carriage element used in the video display tilt apparatus of the present invention;

FIG. 7 is a cross sectional view of the carriage element shown in FIG. 6 taken along sight line 7—7 and also showing the manner in which a support link is coupled to the carriage element; and FIG. 8 shows a resilient thread engaging ring used in combination with the carriage of FIG. 6 for engaging threads on the shaft as shown in FIG. 2.

DESCRIPTION OF THE PREFERRED EMBODIMENT

Referring to FIG. 1, there is shown a perspective view of a tilt apparatus 10 for supporting a video display 12 positioned thereupon at various tilt angles. The video display 12 includes a display unit 14 which might, for example, be a cathode ray tube (CRT). The tilt apparatus 10 includes a base 16 having a plurality of rollers 18 rotationally positioned on a lower portion thereof whereby the tilt apparatus 10 may be displaced over the surface upon which it is positioned or supported. As shown in FIG. 1, a roller 18 is positioned generally adjacent each lower corner of the tilt apparatus base 16. In a preferred embodiment, each roller 18 is engaged by means of a snap-acting coupling and thus may be removed if it is not desired to move the tilt apparatus 10. In addition, each roller 18 is oriented on the lower portion of the base 16 to permit the tilt apparatus 10 to be displaced in a swivel manner while precluding the linear displacement of the tilt apparatus 10 along the surface upon which it is supported. This facilitates changing the viewing direction while maintaining tilt apparatus stability particularly on an inclined or uneven surface. The tilt apparatus base 16 includes a plurality of side panels, with a front panel 26 and a right lateral panel 22 (with the tilt apparatus base 16 viewed from the rear) shown in FIG. 1. In a preferred embodiment and as shown in FIG. 1, the viewing angle perpendicular to the plane of the faceplate of CRT 14 is oriented slightly above the horizontal, typically at an angle of approximately +10°. As described in the following paragraphs, the tilt apparatus 10 of the present invention is capable of tilting the video display 12 forward approximately 15° such that a line extending from the display unit 14 perpendicular to its faceplate is oriented approximately −5° below horizontal. Thus, the present invention is capable of varying the tilt angle of video display 12 through an arc of approximately 15°, although the present invention is not limited to the aforementioned angular displacement limits and various modifications apparent to one skilled in the art could be made to the tilt apparatus of the present invention to provide a larger tilt angle displacement.

Referring to FIGS. 2 and 5, there are shown an exploded perspective view and a side elevational view, respectively, of a tilt apparatus 10 in accordance with a preferred embodiment of the present invention. As mentiond above, tilt apparatus base 16 includes rollers 18 on the lower portion thereof and a front panel 26 and an upper panel 28 as shown in FIG. 2. Thus, in a preferred embodiment tilt apparatus base 16 forms an enclosed housing which may be used not only to support a video display, but also to store various items such as spare video display components. Also, additional operating subsystems of video display 12 may be mounted within the tilt apparatus base 16 and electrically coupled to appropriate other subsystems within the video display to provide an expanded video display capability. The connections and mounting of such components within tilt apparatus base 16 could be conventional in nature and thus such details are not shown in FIG. 2.

In the upper panel 28 of tilt apparatus base 16 is provided a linear groove 32. Linear groove 32 extends between the right- and left-hand lateral portions of base 16 and has various cross sectional dimensions along the length thereof. In general, linear groove 32 is semicircular in shape and includes right and left outer groove portions 34A, 34B adjacent the ends thereof. Proceeding inward, right and left intermediate groove portions 36A, 36B are positioned immediately adjacent corresponding outer groove portions and possess a cross sectional area slightly larger than the outer groove portions. Positioned essentially midway along the length of linear groove 32 is a center groove portion having a larger cross section than the immediately adjacent intermediate groove portions 36A, 36B which it serves to define and separate. Thus, linear groove 32 forms a longitudinal recessed portion of various, symmetrical dimensions on the upper panel 28 of base 16.

Positioned within linear groove 32 is a bi-directionally threaded shaft or bar 42. At each end of shaft 42 are respective right and left shaft end portions 44A, 44B. Proceeding toward the middle portion of shaft 42 and immediately adjacent respective right and left shaft end portions 44A, 44B are right and left intermediate threaded shaft portions 46A, 46B. The right and left threaded shaft portions 46A, 46B include respective thread configurations of opposite orientation. For example, as shown in FIG. 2 the right intermediate threaded shaft portion 46A includes a right-handed thread configuration. On the other hand, the left intermediate threaded shaft portion 46B includes a left-handed thread arrangement. Separating the right and left intermediate threaded shaft portions 46A, 46B and positioned essentially midway along the length of shaft 42 is a center disc 48. When shaft 42 is positioned within linear groove 32, center disc 48 is positioned in contact with the center groove portion 38 and the right and left shaft end portions 44A, 44B are positioned in contact with respective right and left outer groove portions 34A, 34B. The respective cross sectional areas of right and left intermediate groove portions 36A, 36B are larger than the corresponding lower half cross sectional areas of the right and left intermediate threaded shaft portions 46A, 46B. Thus, shaft 42 is in contact with linear groove 32 at the right and left outer groove portions 34A, 34B as well as at the center disc 48 of the linear groove. The generally cylindrical cross sectional shape of the various portions of shaft 42 facilitates its rotation within the semicircular shape of respective, complementary portions of linear groove 32.

Right and left carriages 50A, 50B are positioned over respective ends of shaft 42 such that right and left shaft end portions 44A, 44B extend through respective bores 120 within right and left carriages 50A, 50B. Each of right and left carriages 50A, 50B is adapted by means of two resilient thread engaging rings 52 to engage a respective right and left intermediate threaded shaft portions 46A, 46B. The manner in which the combination of respective ring/carriage combinations engages a respective threaded portion of shaft 42 is described in detail below.

With right carriage 50A positioned upon and engaging right intermediate threaded shaft portion 46A and left carriage 50B positioned upon and engaging left intermediate threaded shaft portion 46B, rotation of shaft 42 in one direction will result in the displacement in opposite directions of the right and left carriages 50A, 50B. For example, viewing the tilt apparatus 10 from the side adjacent control knob 80, rotation of shaft 42 in a clockwise direction will cause right and left carriages 50A, 50B to be displaced outwardly toward respective ends of shaft 42. Similarly, rotation of shaft 42 in a counterclockwise direction will result in the displacement of carriages 50A, 50B toward the center disc 48 of shaft 42. The rate at which the right and left carriages 50A, 50B are displaced with the rotation of shaft 42 will be equal provided the pitch of the respective threaded shaft portions 46A, 46B is the same and is determined by the pitch of the threads and the angular displacement rate of control knob 80.

As shown in FIG. 2, left shaft end portion 44B is provided with a snap-acting coupler 84 positioned on the end thereof. A control knob 80 having an aperture 82 in the center thereof may be positioned upon the snap-acting coupler 84 in a conventional manner. Rotation of control knob 80 will cause a corresponding rotation of the bi-directionally threaded shaft 42. Tilt apparatus 10 may be assembled with control knob 80 on either side of upper panel 28 thus providing the capability to adjust tilt apparatus 10 on either side thereof.

Referring to FIGS. 6, 7 and 8, the manner in which carriages 50A, 50B engage the respective threaded portions of shaft 42 will now be described. Both carriages are identical in configuration, with FIG. 6 showing a side elevational view of right carriage 50A. The carriage 50A includes circular end portions 92, 94. Positioned between end portions 92, 94 is a generally cylindrically shaped center portion 90 having a bore 120 extending longitudinally therethrough. Positioned on respective sides of center portion 90 are left-hand slots or tabs 100, 102 and right-hand slots or tabs 104, 106. Left-hand slots 100, 102 form an angle with the longitudinal axis of the center portion 90 of carriage 50A equal to the pitch of the left intermediate threaded shaft portion 46B. Similarly, right-hand slots 104, 106 form an angle with respect to the longitudinal axis of the carriage center portion 90 equal to the pitch angle of the right intermediate threaded shaft portion 46A. The resilient thread engaging rings 52, shown in FIG. 8, are adapted to be inserted upward over the center portion 90 of carriage 50A such that the straight portion 112 of an engaging ring 52 is inserted in each of the respective slots therein. For example, if an engaging ring 52 is inserted in each of left-hand slots 100, 102 in carriage 50A, the flat portion 112 of each engaging ring 52 will engage the threads of left intermediate threaded shaft portion 46B. Similarly, a pair of engaging rings 52 positioned within each of right-hand slots 104, 106 in carriage 50A will permit the carriage assembly to engage the right intermediate threaded shaft portion 46A. Thus, the basic configuration of a carriage as shown in FIGS. 6 and 7 may be used on either the right or left intermediate threaded shaft portions 46A, 46B, with a pair of slots on the side of the carriage into which engaging rings 52 are positioned determining whether the carriage is positioned upon and coupled with either the right or left intermediate threaded shaft portions 46A, 46B.

Referring to FIG. 8, there is shown a resilient thread engaging ring 52 used in combination of the carriage shown in FIGS. 6 and 7 for engaging threads on the bi-directionally threaded shaft 42. The engaging ring 52 includes a circular portion 110 and a flat, straight portion 112. When positioned upon carriage 50A, the flat portion 112 of engaging ring 52 is positioned within one of the slots or tabs located in a lateral portion thereof for engaging the grooves of either right or left intermediate threaded shaft portions 46A, 46B. The circular portion 110 of engaging ring 52 is positioned generally about the circumference of the center portion 90 of engaging ring 52. A first end portion 114 adjacent the straight portion 112 of engaging ring 52 provides for the secure engagement and stable positioning of the engaging ring 52 upon carriage 50A. Similarly, a second end portion 116 adjacent the circular portion 110 of engaging ring 52 facilitates the positioning of engaging ring upon carriage 50A. Engaging ring 52 is inserted upon a lower portion of carriage 50A so that the open portion of engaging ring 52 is directed upward when it is positioned upon carriage 50A. The outer diameter of the right and left intermediate threaded shaft portions 46A, 46B of shaft 42 is slightly less than the carriage bore 120 to permit the carriages to be easily positioned upon shaft 42 while allowing for the secure engagement of the carriage with a respective threaded portion of the shaft when a pair of engaging rings 52 are properly positioned upon the carriage.

Positioned upon an upper portion of carriage 50A is a carriage flange 96 which includes an engaging pin 98. Engaging pin 98, as shown in FIG. 7, is oriented perpendicular to the direction of the shaft 42 inserted in the carriage bore 120. In addition, engaging pin 98 is shorter at an upper portion thereof to provide a beveled configuration with respect to the vertical. This permits one end of a support link 54A to be inserted over the combination of carriage flange 96 and engaging pin 98 for positioning engaging pin 98 within a pair of support link eyelets 72 located on respective ends of right and left support links 54A, 54B. Each end of a support link is provided with an open portion and includes resilient end portions defining the open portion, which end portions are capable of outward displacement relative to one another. In this manner, a carriage may be pivotally coupled to one end of a support link by means of the snap-acting engagement of an engaging pin 98 within the support link eyelets 72 located on an end of a support link.

This same approach is used in pivotally coupling the other end of a support link to a lower portion of platform 56. Referring to FIGS. 2 and 3, the platform, or support member, 56 includes a platform flange 58 on a lower portion thereof. Securely positioned within and coupled to platform flange 58 is coupling pin 60 which, as in the case of engaging pin 98 positioned within carriage flange 96, includes two beveled ends permitting an end of right or left support links 54A, 54B to be inserted over the platform flange 58 for positioning coupling pin 60 within the support link eyelets 72 located on the end portion of a support link. The platform flange 58 includes two coupling pins 60 mounted in and securely coupled thereto. One coupling pin 60 is coupled to the upper end portion of right support link 54A, while the other coupling pin is coupled to the upper end portion of left support link 54B. As in the case of the lower portion of a support link coupled to the upper portion of a respective carriage, the upper portion of each support link is free to pivot with respect to the platform flange 58 and the platform 56 itself.

A cross sectional view of a support link 54B taken along sight line 4—4 in FIG. 2 is shown in FIG. 4. Each support link has a general "H" cross sectional shape which includes two parallel lateral members 68, 70 coupled by means of a perpendicular cross member 66. Cross member 66 does not extend the entire length of support link 54B so as to provide the open end portions thereof. Each end portion of support link 54B includes two apertures 72 aligned along an axis parallel to the plane of cross member 66 which are positioned on each side of the open space at each end of support link 54B for receiving one of the coupling pins 60 mounted on platform flange 58. The open end portions of support link 54B form a resilient, snap-acting structure into which the combination of flange 58 and coupling pin 60 may be inserted for the temporary spreading of adjacent, facing portions of the end of a support link until coupling pin 60 is aligned with the facing apertures 72 of a support link.

A forward portion of the upper panel 28 of tilt apparatus base 16 is provided with a retaining lip 30 thereon against which a forward, lower portion of video display 12 abuts. Thus, when the aft portion of video display 12 is raised by the tilt apparatus of the present invention, video display 12 is maintained in a stable position upon tilt apparatus base 16. Also located on the upper panel 28 of tilt apparatus base 16 are a plurality of support spacers 40 positioned near the mid-point of linear groove 32. Support spacers 40 maintain a predetermined, minimum displacement between the lower portion of platform 56 and the upper panel 28 of base 16. This predetermined, minimal displacement avoids the positioning of support links 54A, 54B parallel to shaft 42 when platform 56 is in the fully lowered position. By thus insuring that platform 56 is always maintained in a somewhat upraised position relative to the upper panel 28 of base 16, the application of excessive torque to shaft 42 in raising the video display from the full down position is thus avoided. The outer ends of the right and left groove portions 36A, 36B also act as a stop for respective carriages 50A and 50B and thus as as lower limit to the downward displacement of platform 56. Similarly, center disc 48 on shaft 42 not only serves as a support for the shaft within the linear groove 32, but also acts as an upper stop, or displacement limit, for platform 56. In a preferred embodiment of the present invention, all of the aforementioned components of tilt apparatus 10 are comprised of a conventional, high strength plastic material and all connections are of the snap-acting type for simplified assembly and disassembly.

There has thus been shown a video display tilt apparatus which provides infinite adjustment over a predetermined angular range, which in a preferred embodiment is 15°, and which, by virtue of the pitch angle of the threads on a rotatable control shaft, includes a self-locking feature at all intermediate tilt angles. The tilt apparatus of the present invention provides a reliable, low cost, easily assembled structure which is responsive to a single, bi-directional user control input easily accessible on either side of the tilt apparatus.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. An apparatus for supporting a video display over a range of selected vertical tilt angles for improved viewing of said video display, said apparatus comprising:

a base upon which a forward portion of said video display is positioned for the support thereof, said base having first and second lateral facing portions and a linear groove in an upper surface thereof extending between said facing lateral portions;

a shaft having a first right-hand threaded portion and a second left-hand threaded portion along the length thereof, said shaft positioned in the linear groove of said base and free to rotate therein;

a support member upon which an aft portion of said video display is positioned for the support thereof;

first and second links pivotally and rotationally coupled at respective first ends thereof to said first right-hand and second left-hand threaded portions of said shaft, respectively, and pivotally coupled at respective second ends thereof to said support member, wherein said support member is pivotally coupled to said shaft and is free to assume a continuous range of tilt angles relative to the upper surface of said base; and control means fixedly positioned adjacent to one of the lateral facing portions of said base and on one end of said shaft for the rotational displacement of said shaft wherein rotation of said shaft in a first direction causes the displacement of the first ends of said first and second links in respective first and second opposite directions along said shaft in lowering said support member and the aft portion of said video display positioned thereon and rotation of said shaft in a second direction causes the displacement of the first ends of said first and second links in respective second and first opposite directions along said shaft in raising said support member and the aft portion of said video display positioned thereon.

2. An apparatus as in claim 1 wherein said shaft is generally cylindrical and said linear groove has a semicircular cross-section and includes a first enlarged portion equidistant from the ends thereof with said shaft including an enlarged, disc-like portion at the approximate center thereof for positioning in the first enlarged portion of said groove when said shaft is inserted in said groove to facilitate the rotation of said shaft in said groove.

3. An apparatus as in claim 2 wherein said linear groove further includes reduced portions adjacent the ends thereof and said shaft includes non-threaded portions near the respective ends thereof and wherein the non-threaded portions of said shaft are inserted in the respective reduced portions of said groove to facilitate the rotation of said shaft in said groove.

4. An apparatus as in claim 3 further including first and second threaded carriages pivotally coupled to the first ends of said first and second links and positioned on said respective first and second threaded portions of said shaft, wherein said first and second carriages are linearly displaced along said shaft in opposite directions in response to rotation of said shaft.

5. An apparatus as in claim 4 wherein said linear groove further includes second and third enlarged portions intermediate said first enlarged portion and respective reduced portions adjacent the ends of said groove, with said second and third enlarged portions of said groove providing for the free displacement of said first and second carriages respectively therein.

6. An apparatus as in claim 4 wherein said first and second carriages are pivotally coupled to the respective first ends of said first and second links by means of respective snap-acting connectors.

7. An apparatus as in claim 6 wherein the respective second ends of said first and second links are pivotally coupled to said support member by means of respective snap-acting connectors.

8. An apparatus as in claim 1 wherein said base comprises an upper portion of an enclosed housing.

9. An apparatus as in claim 8 wherein said housing includes a plurality of roller means rotationally mounted thereto and radially arranged for facilitating the swivel rotation of said video display on a surface upon which said housing is positioned.

10. An apparatus as in claim 1 wherein said control means comprises a manually operated rotatable knob positioned on one end of said shaft.

11. An apparatus as in claim 10 wherein the end of said shaft upon which said manually operated rotatable knob is positioned may be located adjacent either said first or said second lateral facing portion of said base.

12. An apparatus as in claim 1 wherein said base includes a retaining lip on a forward portion thereof for maintaining said video display in stable position on said base when said support member is raised in tilting said video display downward.

13. An apparatus as in claim 1 wherein said base includes an upraised portion on an upper surface thereof and beneath said support member for maintaining a minimum displacement between said support member and said base for facilitating the upward displacement of said support member from its lowest position.

14. An apparatus for supporting a video display over a range of selected vertical tilt angles for improved viewing of said video display, said apparatus comprising:
a base upon which a forward portion of said video display is positioned for the support thereof, said base having first and second lateral facing portions and a linear groove in an upper surface thereof extending between said lateral facing portions;
a shaft having a first right-hand threaded portion and a second left-hand threaded portion along the length thereof, said shaft positioned in the linear groove of said base and free to rotate therein;
a support member upon which an aft portion of said video display is positioned for the support thereof;
first and second links pivotally and rotationally coupled at respective first ends thereof to said first right-hand and second left-hand threaded portions of said shaft, respectively, and pivotally coupled at respective second ends thereof to said support member, wherein said support member is pivotally coupled to said shaft and is free to assume a continuous range of tilt angles relative to the upper surface of said base; and
control means fixedly positioned adjacent to one of the lateral facing portions of said base and on one end of said shaft for the rotational displacement of said shaft wherein rotation of said shaft in a first direction causes the displacement of the first ends of said links toward opposite ends of said shaft in lowering said support member and the aft portion of said video display positioned thereon and rotation of said shaft in a second direction causes the displacement of the first ends of said links toward the center of said shaft in raising said support member and the aft portion of said video display positioned thereon.

* * * * *